United States Patent

Hofstetter et al.

[11] Patent Number: 5,903,376
[45] Date of Patent: *May 11, 1999

[54] OPTICAL TRANSMITTER FOR AN OPTICAL COMMUNICATION SYSTEM IN CONNECTION WITH A RADIO SYSTEM

[75] Inventors: Rolf Hofstetter, Zizers, Switzerland; Harald Schmuck, Korntal, Germany

[73] Assignee: Alcatel N.V., Rijswijk, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/561,749

[22] Filed: Nov. 22, 1995

[30] Foreign Application Priority Data

Dec. 13, 1994 [DE] Germany ............... 44 44 218

[51] Int. Cl.⁶ .................................................. H04B 10/04
[52] U.S. Cl. ......................................... 359/181; 359/132
[58] Field of Search ..................... 359/115, 123, 359/125, 145, 146, 132, 172, 181

[56] References Cited

U.S. PATENT DOCUMENTS

| | | | |
|---|---|---|---|
| 4,704,715 | 11/1987 | Shibagaki et al. | 359/123 |
| 4,817,206 | 3/1989 | Calvani et al. | 359/154 |
| 4,918,747 | 4/1990 | Bekooij | 359/154 |
| 5,025,487 | 6/1991 | Eichen | 359/182 |
| 5,251,053 | 10/1993 | Heidemann | 359/157 |
| 5,355,381 | 10/1994 | Leilabady | 359/156 |
| 5,432,632 | 7/1995 | Watanabe | 359/126 |

FOREIGN PATENT DOCUMENTS 8910031  10/1989  WIPO ................... 359/182

*Primary Examiner*—Rafael Bacares
*Attorney, Agent, or Firm*—Ware, Fressola, Van Der Sluys & Adolphson LLP

[57] ABSTRACT

A prior art optical transmitter for an optical communication system having a radio system connected thereto comprises a DFB laser, an optical modulator, a signal source, and an optical filter. This optical transmitter transmits light which is not modulated by an intelligence signal. It is disadvantageous in that the optical filter and the DFB laser must be matched. An embodiment of the optical transmitter according to the invention comprises a light source (1), an optical modulator (2), and a control unit (3) which controls the light source (1) and the modulator (2) in such a way that the light emerging at the output (5) of the modulator (2) is modulated with an intelligence signal.

12 Claims, 3 Drawing Sheets

TABLE

| | FIRST CONTROL SIGNAL (A) | SECOND CONTROL SIGNAL (B) | THIRD CONTROL SIGNAL (C) | OUTPUT (5 OR 13) (D) |
|---|---|---|---|---|
| 1. | ASK | CW | - | ASK |
| 2. | DC | CW | ASK | ASK |
| 3. | DC | ASK | - | ASK |
| 4. | DC | CW | FSK | FSK |
| 5. | DC | PSK | - | PSK |
| 6. | DC | QAM | - | QAM |
| 7. | DC | CW | PSK | PSK |
| 8. | ASK | PSK | - | QAM |
| 9. | DC | ASK | PSK | QAM |
| 10. | AM | CW | - | AM |
| 11. | DC | AM | - | AM |
| 12. | DC | FM | - | FM |
| 13. | DC | PM | - | PM |
| 14. | DC | CW | AM | AM |
| 15. | DC | CW | FM | FM |
| 16. | DC | CW | PM | PM |
| 17. | AM | PM | - | AM AND PM |

FIG.2

OPTICAL TRANSMITTER FOR AN OPTICAL COMMUNICATION SYSTEM IN CONNECTION WITH A RADIO SYSTEM

TECHNICAL FIELD

The present invention relates to a communications system comprising an optical transmitter, an optical waveguide, and an optical receiver, wherein the optical transmitter transmits light having two optical components which is received by the optical receiver with the two optical components mixing coherently, and to an optical transmitter for such a communications systems having a light source and an optical modulator for modulating light emitted by the light source, the light source being controlled by an operating current, and the optical modulator by a control voltage. The invention further elates to a method of

BACKGROUND OF THE INVENTION

A communication system and an optical transmitter with the features recited in the preamble are known from J. J. O'Reilly, "RACE R2005: microwave optical duplex antenna link", IEE Proceedings-J, Vol. 140, No. 6, December 1993, pages 385–391. The optical transmitter shown in FIG. 2 of that article forms part of an optical communication system illustrated in FIG. 1, wherein besides an optical receiver including an optical-to-electrical transducer, an antenna is provided at the receiving end. Between this antenna and a remote radio station (transposer), radio signals with a frequency of, e.g., 60 GHz are transmitted; the wavelength of these radio signals thus lies in the range of a few millimeters. The optical transmitter (dual frequency optical source) shown in FIG. 2 of that article comprises a DFB laser, an optical modulator, a signal source, and an optical filter. The light emitted by the DFB laser is a continuous-wave signal and has an optical frequency $\upsilon_0$ (carrier frequency). This light is fed into one input of the optical modulator, which is controlled by a control voltage (cw-drive signal V(t)) from the signal source. The control voltage V(t) is composed of a bias voltage and a sinusoidal voltage of fixed frequency $\omega$. The control voltage V(t) as a function of time is given in Equation (1) of the article, and the electric field strength as a function of time which results at the output of the optical modulator is given in Equation (3). The emerging light has a frequency spectrum with two distinct frequency components (spectral lines) which are spaced by the fixed frequency $\omega$ of the control voltage V(t) either side of the suppressed optical carrier frequency $\upsilon_0$, i.e., the two frequency components are spaced $2\omega$ apart.

The optical filter following the output of the first optical modulator separates the two frequency components. It therefore has two outputs O/P1 and O/P2. To permit optimum separation of the two frequency components, the optical transmitter has a control unit which controls the DFB laser such that the optical frequency $\upsilon_0$ is always tuned to the optical filter.

The above-described optical transmitter thus generates two optical components which are not modulated by an intelligence signal. To enable such an optical transmitter to transmit light modulated by an intelligence signal, one (a first) output of the optical filter is connected to an optical modulator, and the other (second) output to a coupler. The optical modulator modulates the optical component emerging at the first output of the optical filter with an intelligence signal. This modulation is an external modulation. The frequency spectrum of the modulated optical component thus has only one of the two frequency components. This modulated optical component, which appears at the output of the optical modulator, and the optical component appearing at the second output of the optical filter are coupled into an optical fiber through the coupler.

Thus, the light propagating in the optical fiber is composed of two optical components: a modulated optical component with the first frequency and an unmodulated optical component with the second frequency. In the optical receiver, this composite light falls on the surface of a PIN photodiode, where the two optical components mix coherently to produce the desired millimeter-wave signal.

As mentioned, the optical transmitter comprises an optical filter and a frequency controller for the DFB laser. The optical filter must meet stringent selectivity requirements. Such an optical filter is therefore expensive. Stringent requirements must also be placed on the frequency control, so that the latter also involves high complexity, since the optical frequency $\upsilon_0$ of the DFB laser and the optical filter must be mutually stabilized. This optical transmitter adds significantly to the cost and complexity of the entire communications system.

DISCLOSURE OF INVENTION

It is an object of the invention to provide a low-cost communications system.

According to a first aspect of the present invention, a communications system comprising an optical transmitter, an optical waveguide, and an optical receiver, wherein the optical transmitter transmits light having two optical components, which is received by the optical receiver, with the two optical components mixing coherently, is characterized in that both optical components transmitted by the optical transmitter are modulated by an intelligence signal to be transmitted.

It is another object of the invention to provide an optical transmitter for a communications system which can be implemented at low cost and with little circuitry. According to a second aspect of the present invention, an optical transmitter having a light source and an optical modulator for modulating light emitted by the light source, the light source being controlled by an operating current and the optical modulator by a control voltage, is characterized in that a control unit is provided which modulates the operating current of the light source or the control voltage for the optical modulator with an intelligence signal, so that light emerging at an output of the modulator is modulated by the intelligence signal.

According to a third aspect of the present invention, an optical transmitter having a light source and an optical modulator for modulating light emitted by the light source, the light source being controlled by an operating current, and the optical modulator by a control voltage, is characterized in that a control unit is provided which modulates the operating current of the light source and the control voltage for the optical modulator either with a single intelligence signal or with two different intelligence signals, so that light emerging at the output of the optical modulator is modulated by one or two intelligence signals.

According to a fourth aspect of the present invention, an optical transmitter having a light source and an optical modulator for modulating light emitted by the light source, the light source being controlled by an operating current, and the optical modulator by a first control voltage, is characterized in that a second optical modulator is provided which is controlled by a second control voltage and has an input for light coming from the first optical modulator and that a control unit is provided which controls the light source and the two optical modulators so that light emerging at an output of the second optical modulator is modulated by an intelligence signal.

It is a further object of the invention to provide a simplified method of transmitting intelligence signals.

According to a fifth aspect of the present invention, a method of transmitting intelligence signals wherein light comprising two optical components modulated by an intelligence signal to be transmitted is transmitted from an optical transmitter over an optical waveguide to an optical receiver, with the two modulated optical components being mixed coherently.

One advantage of the invention is that the light to be transmitted is less attenuated, since no optical filter is needed in the optical transmitter according to the invention. Thus, after detection in the optical receiver, a power level higher by more than 10 dB is available for the millimeter-wave signal.

Another advantage of the invention is that the frequency spacing 2υ can be arbitrary, because no optical filter is necessary.

BRIEF DESCRIPTION OF THE DRAWING

FIG. 2 shows a table of possible combinations of control signals; and

BEST MODE FOR CARRYING OUT THE INVENTION

Figure 1:
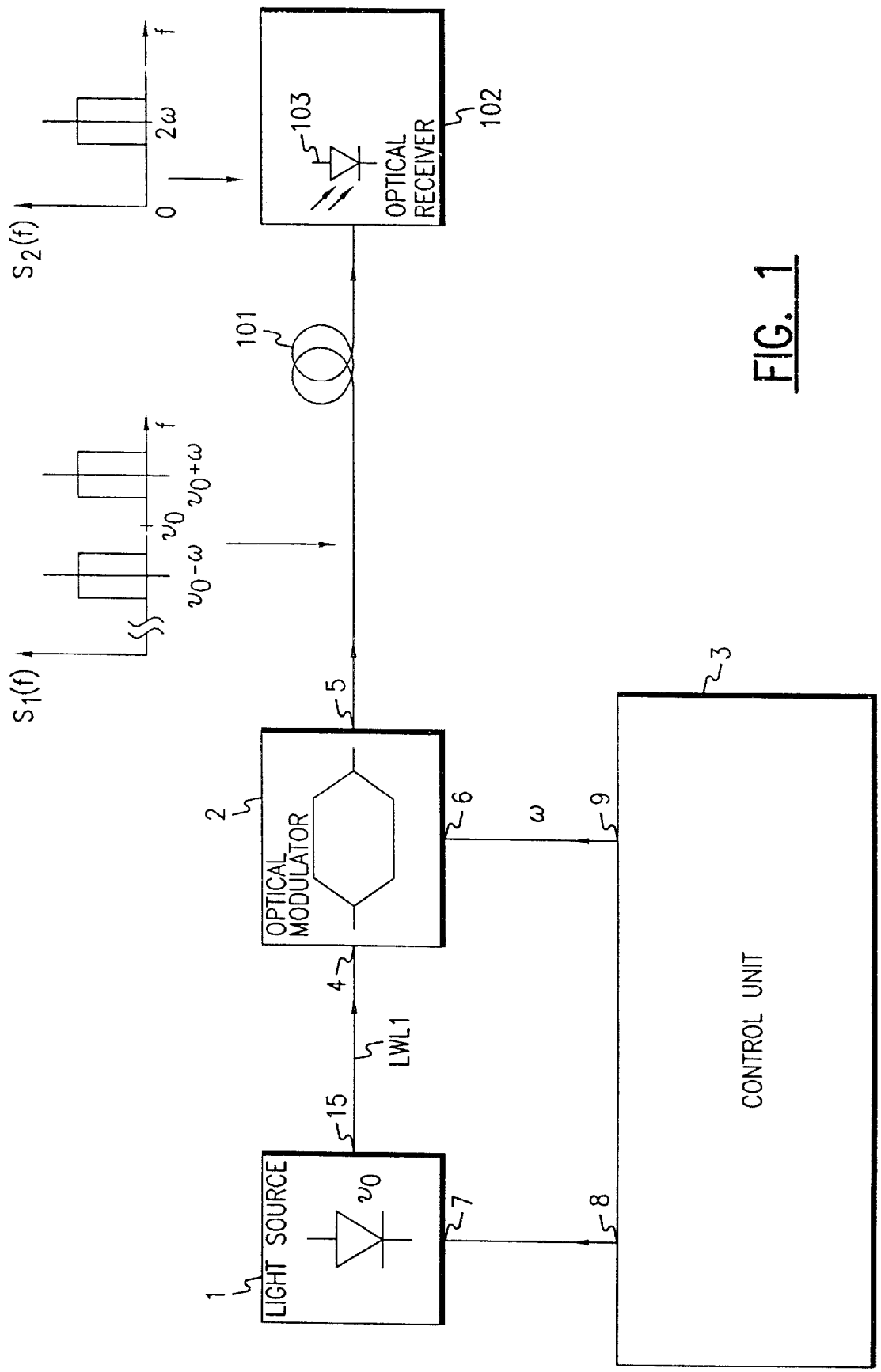
FIG. 1 is a block diagram of a communications system with a first embodiment of an optical transmitter.

Referring to FIG. 1, there is shown a block diagram of a communications system with a first embodiment of an optical transmitter comprising a light source 1, an optical modulator 2 having an input 4, an output 5, and a terminal 6, and a control unit 3. An output 15 of the light source 1 is connected to the input 4 of the optical modulator 2 by an optical fiber LWL1, so that light emitted by the light source 1 enters the optical modulator 2. An optical fiber 101 connects the output 5 to an optical receiver 102 containing a photodiode 103. The optical fiber 101 may also be branched, so that more than one receiver is connectable to the output 5.

The control unit 3 has two outputs 8, 9 for electric control signals: The output 8 is connected to a terminal 7 of the light source 1, and the output 9 is connected to the terminal 6 of the optical modulator 2.

The light source 1 will generally be a laser module containing, for example, a DFB laser, a temperature control circuit, and a power control circuit. The DFB laser emits laser light which has a wavelength of, e.g., 1550 nm or, in other words, an optical frequency $\upsilon_0$ of 193 THz. For such laser light, the term "light" will hereinafter be used, regardless of whether it is visible or invisible. A DFB laser is a single-mode laser, i.e., it emits laser light which has only one wavelength (ideally only one spectral line). Instead of the DFB laser, a BH laser can be used, for example; this is a multimode laser, i.e., it emits laser light consisting of several, e.g.,10, spectral lines.

It is possible to fabricate the DFB laser, the optical fiber LWL1, and the optical modulator 2 using integrated optics.

The optical modulator 2 is, for example, a Mach-Zehnder modulator, which is generally known, e.g., from R. G. Walker, "High-Speed III-V Semiconductor Intensity Modulators", IEEE Journal of Quantum Electronics, Vol. 27, No. 3, March 1991, pages 654 to 667. The optical modulator 2 can also be any of the other modulators mentioned therein.

How the light source 1 and the optical modulator are controlled by the control unit 3 to modulate the light emerging at the output 5 of the modulator with an intelligence signal will now be explained with reference to FIG. 2. The control unit 3 provides a first control signal for the light source 1 and a second control signal for the optical modulator 2. The light source 1 is controlled by a current, and the optical modulator by a voltage. Accordingly, the control unit 3 contains corresponding devices (not shown in FIG. 1), such as a current source and a voltage source. The first control signal for the light source 1 is an operating current for the laser (laser current), and the second control signal is a control voltage. If a Mach-Zehnder modulator is used, the control voltage will be composed of a bias voltage, by which an operating point is set, and a sinusoidal voltage. For simplicity, the control voltage will hereinafter be equated with the sinusoidal voltage, without explicitly mentioning the bias voltage.

In FIG. 1, two frequency spectra $S_1(f)$, $S_2(f)$ are shown to explain the invention. The optical fiber 101 guides light which has the frequency spectrum $S_1(f)$. The two frequency components are disposed symmetrically about the optical frequency $\upsilon_0$ and are spaced $2\omega$ apart: One frequency component is at $\upsilon_0-\omega$, and the other at $\upsilon_0+\omega$. An intelligence signal contained in the light is indicated in a usual manner of representation.

An electric signal corresponding to the intelligence signal, which is generated by the photodiode 103, has the frequency spectrum $S_2(f)$. This frequency spectrum $S_2(f)$ has a frequency band centered at $2\omega$.

The frequency spectra $S_1(f)$, $S_2(f)$ of FIG. 1 result if a DFB laser is used. Light of optical frequency $\upsilon_0$ emitted by this laser is split into two optical components: an optical component of frequency $\upsilon_0-\omega$ and an optical component of frequency $\upsilon_0+\omega$. If a BH laser is used, the light emitted by it will also be split into two optical components. If the light of the BH laser has ten spectral lines, for example, twenty spectral lines are obtained after the splitting, i.e., each spectral line is doubled. In that case, one optical component consists of ten spectral lines, and the other also of ten spectral lines.

In FIG. 2 a selection of several possible combinations of the first and second control signals (columns A, B) to obtain a desired output signal (column D) is shown in a table. A third control signal included in this table (column C) will be explained in connection with FIG. 3. Rows 1 to 9 of the table show possible combinations to obtain light at the output 5 which is modulated with a digital intelligence signal, and rows 10 to 17 show possible combinations to obtain light at the output 5 which is modulated with an analog intelligence signal. An intelligence signal can be both a data signal and a voice signal.

To obtain intensity-modulated light (ASK, amplitude-shift keying) at the output 5 (row 1), the first control signal, i.e., the laser current, is a digital intelligence signal, so that light emitted by the light source 1 is modulated in intensity according to the information contained in the laser current (ASK); the light source 1 can, for example, be controlled in such a manner that the light intensity has two discrete values. The second control signal, i.e., the control voltage, is a constant-amplitude sinusoidal signal of fixed frequency $\omega$(cw). The optical modulator 2, which is controlled with this signal, splits the modulated light into two correspondingly modulated optical components of different frequencies $\upsilon_\circ-\omega$, $\upsilon_{\circ+\omega}$.

Alternatively it is possible (row 3) that the first control signal, i.e., the laser current, is a direct current (DC) carrying no intelligence signal, so that light emitted by the light source 1 has a constant intensity and the second control signal is a digital intelligence signal which is a variable-amplitude sinusoidal signal of fixed frequency (ASK). This means that the second control signal (sinusoidal signal) is modulated in accordance with the digital intelligence signal to be transmitted, e.g., that it is turned on and off; its amplitude then has two discrete values.

It is also possible to control the light source 1 by an intelligence-signal-carrying direct current and the optical modulator 2 by an intelligence-signal-carrying control voltage, so that light emerging at the output 5 is intensity-modulated (row 8). In that case there are two possibilities: The two intelligence signals are equal, or the intelligence signals are different. In the case of QAM-modulated light (row 8), one intelligence signal is represented by the intensity of the light, and the other by its phase. The two intelligence signals can be recovered with a suitable demodulator. With a combination as shown in row 17, too, the intelligence signal can be contained in the intensity and phase of the light.

As the table is self-explanatory, not all possible combinations are given here. Besides the above-explained abbreviations ASK, CW, and DC, the following abbreviations are contained in the table: FSK, frequency-shift keying PSK, phase-shift keying QAM, quadrature amplitude modulation AM, amplitude modulation FM, frequency modulation.

The optical transmitter shown in FIG. 1 can transmit both amplitude-modulated, i.e., ASK, AM, QAM, and angle-modulated, i.e., FSK, FM, PSK, PM, intelligence signals.

Figure 3:
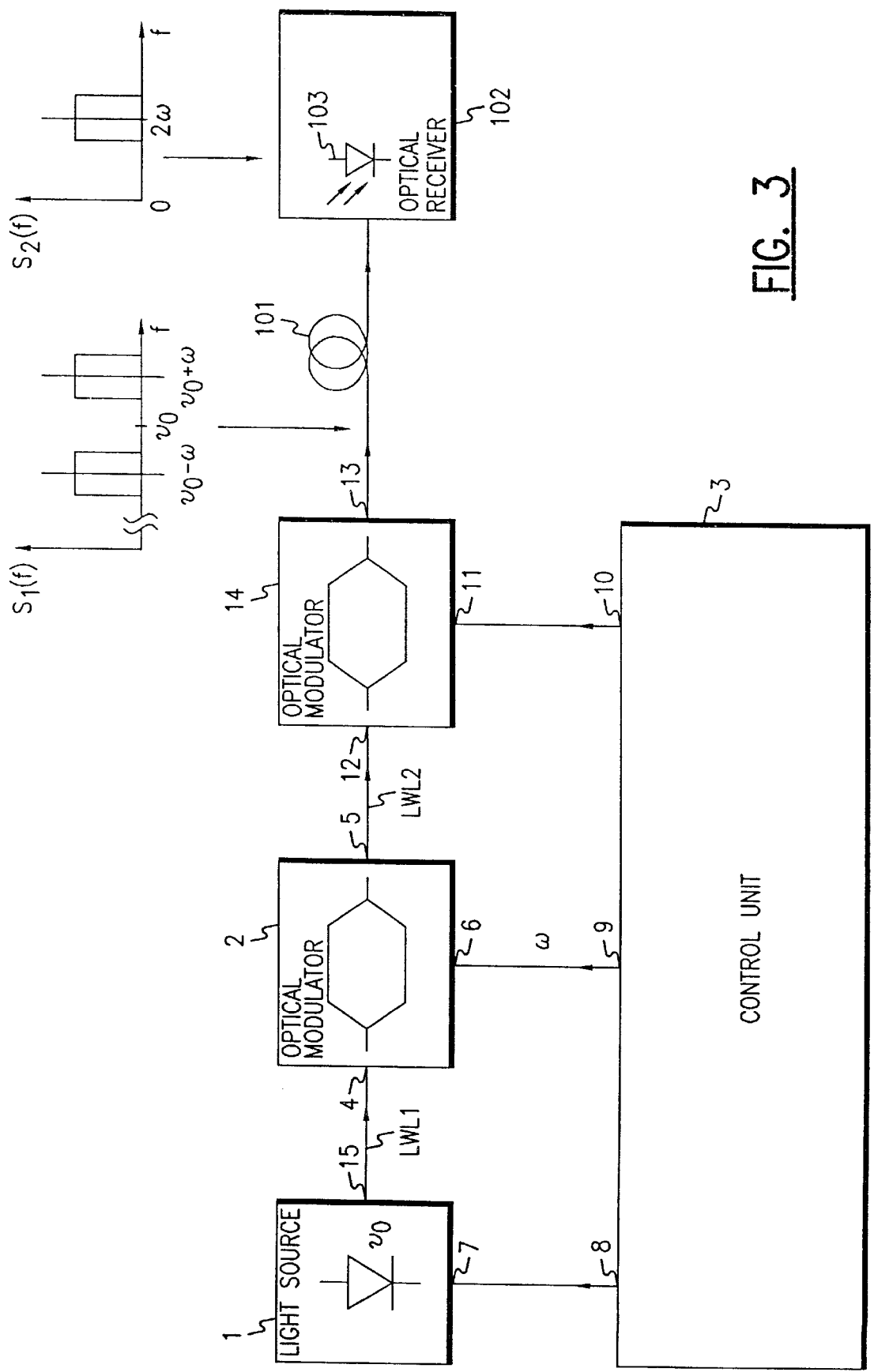
FIG. 3 is a block diagram of a communications system with a second embodiment of an optical transmitter.

FIG. 3 is a block diagram of a communications system with a second embodiment of an optical transmitter. This embodiment is an extension of the first embodiment shown in FIG. 1. The light source 1, the optical modulator 2, and the control unit 3 are arranged in the same way, and designated by the same reference characters, as in FIG. 1. Therefore, only the extension will be described in the following.

The output 5 of the first optical modulator 2 is connected to an input 12 of an optical modulator 14 by an optical fiber LWL2.

The control unit 3 has an additional, third output 10 for a third control signal. The third control signal, like the second control signal, is a control voltage. This output 10 is connected to a terminal 11 of the optical modulator 14. Here, too, each of the control voltages contains a bias voltage even though the latter is not explicitly mentioned.

Light emerging at an output 13 of the optical modulator 14 also has a frequency spectrum with two spectral components. This output 13 is connected via the optical fiber 101 to the receiving device 102, which contains the photodiode 103.

FIG. 3, like FIG. 1, shows two frequency spectra $S_1(t)$, $S_2(t)$, to which the same comments as those made in connection with FIG. 1 apply.

To explain how the control unit 3 controls the light source 1 and the two optical modulators 2, 14, reference is again made to FIG. 2. Possible combinations of the three control signals (columns A, B, C) for the optical transmitter of FIG. 3 are given in rows 2, 4, 7, 9, 14, 15, 16.

It will be explained by way of example how it comes about that light with two frequency components which is ASK-modulated by a digital intelligence signal (row 2) emerges at the output 13. The first control signal, i.e., the laser current, is a direct current (DC) which is not modulated by intelligence, so that the light source 1 emits light of constant intensity. The second control signal, i.e., the (first) control voltage, is a constant-amplitude sinusoidal signal of fixed frequency $\omega$. Accordingly, light emerging at the output 5 of the optical modulator 2 is unmodulated but contains two frequency components. The third control signal, i.e., the (second) control voltage, carries an intelligence signal and is a variable-amplitude sinusoidal signal of fixed frequency. Thus, the modulator 14 modulates both frequency components of the light entering it with intelligence.

The optical transmitter of FIG. 3, like that of FIG. 1, can transmit both amplitude-modulated, i.e., ASK, AM, and angle-modulated, i.e., FSK, FM, PSK, PM, intelligence signals.

The common idea underlying the two embodiments of an optical transmitter is that by suitable control of the individual parts (see table in FIG. 2), the optical transmitter is caused to emit light which contains two frequency components and is modulated with an intelligence signal. Thus, unlike in the prior art optical transmitter mentioned at the beginning, no filtering and no control are necessary. Accordingly, the light propagating in the optical fiber 101 consists of two optical components which are both modulated by an intelligence signal. In the optical receiver 102, these two optical components are mixed coherently. In the prior art communications system mentioned at the beginning, only one optical component of the light propagating in the optical fiber is modulated by an intelligence signal.

The communications system according to the invention uses a method of transmitting intelligence signals wherein light consisting of two optical components modulated by an intelligence signal is transmitted from the optical transmitter of FIG. 1 or 3 over the optical fiber 101 to the optical receiver 102, with the two modulated optical components being mixed coherently.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claims:

1. An optical transmitter having a light source (1) and an optical modulator (2) for modulating light emitted by the light source (1), the light source (1) being controlled by an operating current, and the optical modulator (2) by a control voltage, characterized in that a control unit (3) is provided which modulates the operating current of the light source (1) or the control voltage for the optical modulator (2) with an intelligence signal, so that light emerging at an output (5) of the optical modulator (2) is modulated by the intelligence signal.

2. An optical transmitter as claimed in claim 1, characterized in that the control unit (3) controls the light source (1) with a direct current carrying the intelligence signal, so that light emitted by the light source (1) is intensity-modulated, and that the control unit (3) controls the optical modulator (2) with a control voltage of constant amplitude and constant frequency, so that light emerging at the output (5) of the optical modulator (2) is intensity-modulated.

3. An optical transmitter as claimed in claim 1, characterized in that the control unit (3) controls the light source (1) with a direct current carrying no intelligence signal, so that light emitted by the light source (1) has a constant intensity, and that the control unit (3) controls the optical modulator (2) with a variable-amplitude and constant-frequency control voltage, so that light emerging at the output (5) of the optical modulator (2) is intensity-modulated.

4. An optical transmitter as claimed in claim 1, characterized in that the control unit (3) controls the light source (1) with a direct current carrying no intelligence signal, so that light emitted by the light source (1) has a constant intensity, and that the control unit (3) controls the optical modulator (2) with a constant-amplitude and variable-frequency control voltage carrying the intelligence signal, so that light emerging at the output (5) of the optical modulator (2) is angle-modulated.

5. An optical transmitter having a light source (1) and an optical modulator (2) for modulating light emitted by the light source (1), the light source (1) by an operating current, and the optical modulator (2) by a control voltage, characterized in that a control unit (3) is provided for modulating the operating current of the light source (1) and the control voltage for the optical modulator (2) either with a single intelligence signal or with two different intelligence signals, so that light emerging at the output (5) of the optical modulator (2) is modulated by one or two intelligence signals.

6. An optical transmitter having a light source (1) and an optical modulator (2) for modulating light emitted by the light source (1), the light source (1) for control by an operating current, and the optical modulator (2) by a first control voltage, characterized in that a second optical modulator (14) is provided for control by a second control voltage and has an input (12) for light coming from the first optical modulator (2), and that a control unit (3) is provided for controlling the light source (1) and the two optical modulators (2, 14) so that light emerging at an output (13) of the second optical modulator (14) is modulated by an intelligence signal.

7. An optical transmitter as claimed in claim 6, characterized in that the control unit (3) is for controlling the light source (1) with a direct current carrying no intelligence signal, so that light emitted by the light source (1) has a constant intensity, that the control unit (3) is for controlling the first optical modulator (2) with the first control voltage of constant amplitude and constant frequency, so that light emerging at an output (5) of the first optical modulator (2) carries no intelligence, and that the control unit (3) is for controlling the second optical modulator (14) with the second control voltage carrying the intelligence signal, so that light emerging at the output (13) of the second optical modulator (114) is intensity- or angle-modulated.

8. An optical transmitter as claimed in claim 7, characterized in that the intelligence signal is an amplitude-modulated signal, so that light emerging at the output (13) of the second optical modulator (14) is intensity-modulated.

9. An optical transmitter as claimed in claim 6, characterized in that the intelligence signal is an angle-modulated signal, so that light emerging at the output (13) of the second optical modulator (14) is angle-modulated.

10. An optical transmitter as claimed in claim 6, characterized in that the control unit (3) is for controlling the light source (1) with a direct current carrying no intelligence signal, so that light emitted by the light source (1) has a constant intensity, that the control unit (3) is for controlling the first optical modulator (2) with the intelligence-signal-carrying first control voltage of variable amplitude and constant frequency, so that light emerging at an output (5) of the first optical modulator (2) is intensity-modulated, and that the control unit (3) is for controlling the second optical modulator (14) with the intelligence-signal-carrying second control voltage of constant amplitude and variable frequency, so that light emerging at the output (13) of the second modulator (14) is intensity-modulated.

11. A communications system comprising an optical transmitter, an optical waveguide, and an optical receiver (102), wherein the optical transmitter transmits light having two optical components, which is received by the optical receiver (102), with the two optical components mixing coherently, characterized in that both optical components transmitted by the optical transmitter (1, 2, 3; 14) are independently modulated by an intelligence signal and are mixed in the optical receiver coherently after traveling the optical waveguide.

12. A method of transmitting intelligence signals comprising the steps of independently modulating light having two optical components with an intelligence signal, transmitting the two optical components modulated by the intelligence signal from an optical transmitter over an optical waveguide (101) to an optical receiver (102), and detecting the two optical components which are mixed coherently in the optical receiver after traveling the optical waveguide.

* * * * *

UNITED STATES PATENT AND TRADEMARK OFFICE
CERTIFICATE OF CORRECTION

PATENT NO. : 5,903,376
DATED : May 11, 1999
INVENTOR(S) : Hofstetter et al

It is certified that error appears in the above-identified patent and that said Letters Patent is hereby corrected as shown below:

Title page, item [56], prior to line 7, please insert:

```
--5,128,790   7/1992   Heidemann et al      359/132
  5,162,937  11/1992   Heidemann et al      359/124
  5,181,106   1/1993   Sutherland           358/86
  5,202,780   4/1993   Fussgänger           359/125--; and
``` prior to line 8, please insert:

```
--5,337,175   8/1994   Ohnsorge et al       359/125--.
```

Signed and Sealed this

Twenty-eighth Day of September, 1999

Attest:

Q. TODD DICKINSON

Attesting Officer

Acting Commissioner of Patents and Trademarks